(12) United States Patent
Korja et al.

(10) Patent No.: US 11,848,909 B2
(45) Date of Patent: Dec. 19, 2023

(54) RESTRICTING ONBOARD TRAFFIC

(71) Applicant: NOKIA TECHNOLOGIES OY, Espoo (FI)

(72) Inventors: Pekka Juhani Korja, Kauniainen (FI); Rainer Liebhart, Munich (DE); Markus Sakari Isomaki, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/480,558

(22) Filed: Sep. 21, 2021

(65) Prior Publication Data
US 2023/0087052 A1 Mar. 23, 2023

(51) Int. Cl.
*H04L 61/4552* (2022.01)
*H04L 67/56* (2022.01)
*H04L 61/4511* (2022.01)
*H04L 61/4541* (2022.01)
*H04L 9/40* (2022.01)

(52) U.S. Cl.
CPC ...... *H04L 61/4552* (2022.05); *H04L 61/4511* (2022.05); *H04L 61/4541* (2022.05); *H04L 63/0236* (2013.01); *H04L 63/0263* (2013.01); *H04L 63/0281* (2013.01); *H04L 67/56* (2022.05)

(58) Field of Classification Search
CPC ............. H04L 61/4552; H04L 61/4511; H04L 61/4541; H04L 63/0236; H04L 63/0263; H04L 63/0281; H04L 67/56
See application file for complete search history.

(56) References Cited

U.S. PATENT DOCUMENTS

| 9,189,626 | B1 * | 11/2015 | Overfield | G06F 21/554 |
| 9,986,414 | B1 * | 5/2018 | Mangal | H04L 65/1073 |
| 2010/0189099 | A1 * | 7/2010 | Bae | H04L 61/2575 |
| | | | | 370/352 |
| 2011/0142015 | A1 * | 6/2011 | Shaikh | H04L 65/1104 |
| | | | | 709/227 |

(Continued)

OTHER PUBLICATIONS

"3rd Generation Partnership Project; Technical Specification Group Core Network and Terminals; Interface between the Control Plane and the User Plane Nodes; Stage 3 (Release 17)", 3GPP TS 29.244 v17.2.0, (Sep. 2021), 356 pages.

(Continued)

*Primary Examiner* — Jimmy H Tran
(74) *Attorney, Agent, or Firm* — ALSTON & BIRD LLP

(57) ABSTRACT

Techniques for providing more efficient onboarding traffic protocols in a standalone non-public network architecture are provided. A network entity includes processing circuitry and at least one memory including computer program code. The at least one memory and the computer program code configured to, with the processing circuitry, cause the network entity at least to generate one or more traffic filter rules for a traffic filter set. The one or more traffic filter rules or traffic detection rules are generated based at least in part on domain name service query response information related to one or more user device originated domain name service queries. The network entity may further be configured to cause a user plane function to be provided with the one or more traffic filter rules.

22 Claims, 10 Drawing Sheets

(56) References Cited

U.S. PATENT DOCUMENTS

| | | | | |
|---|---|---|---|---|
| 2012/0207151 | A1* | 8/2012 | Alt | H04L 65/104 |
| | | | | 370/395.54 |
| 2014/0105103 | A1* | 4/2014 | Nethi | H04W 12/03 |
| | | | | 370/328 |
| 2015/0026756 | A1* | 1/2015 | Reddy | H04W 12/08 |
| | | | | 726/1 |
| 2016/0014082 | A1* | 1/2016 | Bharali | H04L 63/02 |
| | | | | 726/1 |
| 2016/0219035 | A1* | 7/2016 | Zhou | H04L 63/0807 |
| 2020/0045753 | A1* | 2/2020 | Dao | H04W 4/08 |
| 2020/0145417 | A1* | 5/2020 | Larish | H04L 63/0876 |
| 2020/0366639 | A1* | 11/2020 | Saidumuhamed | H04L 69/16 |
| 2020/0404106 | A1* | 12/2020 | Belling | H04W 8/10 |
| 2021/0058784 | A1* | 2/2021 | Kedalagudde | H04W 48/18 |
| 2021/0075865 | A1* | 3/2021 | Zhu | H04L 45/74 |
| 2021/0084008 | A1* | 3/2021 | Kuperman | H04L 61/4511 |
| 2021/0105712 | A1* | 4/2021 | Speicher | H04W 48/08 |
| 2021/0168881 | A1* | 6/2021 | Kedalagudde | H04W 76/12 |
| 2021/0211879 | A1* | 7/2021 | Zisimopoulos | H04W 12/37 |
| 2021/0211975 | A1* | 7/2021 | Prabhakar | H04W 48/16 |
| 2021/0226914 | A1* | 7/2021 | Shan | H04L 61/4511 |
| 2021/0226918 | A1* | 7/2021 | Ossipov | H04L 63/20 |
| 2021/0306853 | A1* | 9/2021 | Gundavelli | H04W 12/06 |
| 2021/0306854 | A1* | 9/2021 | Gundavelli | H04W 8/24 |
| 2021/0368434 | A1* | 11/2021 | Kweon | H04W 8/005 |
| 2021/0368556 | A1* | 11/2021 | Kedalagudde | H04W 48/16 |
| 2021/0377210 | A1* | 12/2021 | Singh | G06F 21/73 |
| 2021/0409335 | A1* | 12/2021 | Zhu | H04L 47/24 |
| 2021/0410059 | A1* | 12/2021 | Talebi Fard | H04W 40/02 |
| 2022/0030539 | A1* | 1/2022 | Kumar | H04W 60/04 |
| 2022/0060894 | A1* | 2/2022 | Pazhyannur | H04L 63/101 |
| 2022/0124850 | A1* | 4/2022 | Gundavelli | H04W 76/15 |
| 2022/0174575 | A1* | 6/2022 | Yang | H04W 36/32 |
| 2022/0240330 | A1* | 7/2022 | Xiang | H04W 28/0846 |
| 2022/0247678 | A1* | 8/2022 | Atwal | H04L 63/0428 |
| 2022/0263788 | A1* | 8/2022 | Lee | H04L 61/4541 |
| 2022/0278955 | A1* | 9/2022 | Roy | H04L 61/4541 |
| 2022/0286431 | A1* | 9/2022 | Winn | H04L 63/20 |
| 2022/0322202 | A1* | 10/2022 | Li | H04M 15/8016 |
| 2022/0330022 | A1* | 10/2022 | Kolekar | H04W 60/00 |
| 2022/0346051 | A1* | 10/2022 | Salkintzis | H04W 12/037 |
| 2022/0360493 | A1* | 11/2022 | Sung | H04L 41/0806 |
| 2022/0360962 | A1* | 11/2022 | Tseng | H04W 8/18 |
| 2022/0368676 | A1* | 11/2022 | Shribman | H04L 63/029 |
| 2022/0394088 | A1* | 12/2022 | Salkintzis | H04L 67/1036 |
| 2022/0408502 | A1* | 12/2022 | Yu | H04W 76/11 |
| 2022/0418011 | A1* | 12/2022 | Abdelmalek | H04W 64/00 |
| 2023/0014351 | A1* | 1/2023 | Radhakrishnan | H04L 63/0227 |
| 2023/0015696 | A1* | 1/2023 | Speicher | H04W 8/186 |
| 2023/0060895 | A1* | 3/2023 | Wu | H04L 63/0236 |
| 2023/0156095 | A1* | 5/2023 | Lohmar | H04L 67/02 |
| | | | | 709/245 |
| 2023/0198948 | A1* | 6/2023 | Moore | H04L 63/0245 |
| | | | | 726/11 |
| 2023/0199480 | A1* | 6/2023 | Tao | H04W 4/021 |
| | | | | 370/338 |

OTHER PUBLICATIONS

"3rd Generation Partnership Project; Technical Specification Group Core Network and Terminals; Numbering, addressing and identification; (Release 17)", 3GPP TS 23.003 v17.3.0, (Sep. 2021), 145 pages.

"3rd Generation Partnership Project; Technical Specification Group Services and System Aspects; 5G System Enhancements for Edge Computing; Stage 2 (Release 17)", 3GPP TS 23.548 v2.0.0, (Sep. 2021), 52 pages.

"3rd Generation Partnership Project; Technical Specification Group Services and System Aspects; Architecture enhancements for control and user plane separation of EPC nodes; Stage 2 (Release 17)", 3GPP TS 23.214 v17.0.0, (Jun. 2021), 99 pages.

"3rd Generation Partnership Project; Technical Specification Group Services and System Aspects; Policy and charging control framework for the 5G System (5GS); Stage 2 (Release 17)", 3GPP TS 23.503 v17.1.0, (Jun. 2021), 137 pages.

"3rd Generation Partnership Project; Technical Specification Group Services and System Aspects; Procedures for the 5G System (5GS); Stage 2 (Release 17)", 3GPP TS 23.502 v17.1.0, (Jun. 2021), 692 pages.

"3rd Generation Partnership Project; Technical Specification Group Services and System Aspects; Security architecture and procedures for 5G system (Release 17)", 3GPP TS 33.501 v17.3.0, (Sep. 2021), 258 pages.

"3rd Generation Partnership Project; Technical Specification Group Services and System Aspects; Study on encrypted traffic detection and verification (Release 16)", 3GPP TR 23.787 v0.4.0, (Jun. 2018), 46 pages.

"3rd Generation Partnership Project; Technical Specification Group Services and System Aspects; System architecture for the 5G System (5GS); Stage 2 (Release 17)", 3GPP TS 23.501 v17.1.1, (Jun. 2021), 526 pages.

Contavalli et al., "Client Subnet in DNS Queries", Internet Engineering Task Force (IETF) Request for Comments: 7871, (May 2016), 30 pages.

Pritikin et al., "Bootstrapping Remote Secure Key Infrastructure", Internet Engineering Task Force (IETF) Request for Comments: 8995, (May 2021), 116 pages.

International Search Report and Written Opinion for Patent Cooperation Treaty Application No. PCT/EP2022/074668 dated Jan. 26, 2023, 18 pages.

Lenovo et al., "Update on the Procedure for EAS (Re-)Discovery Over Session Breakout Connectivity Model", SA WG2 Meeting #S2-144E, S2-2102598, (Apr. 12-16, 2021), 6 pages.

Partial International Search Report for Patent Cooperation Treaty Application No. PCT/EP2022/074668 dated Dec. 5, 2022, 14 pages.

Tencent, "Solution for IP Address Discovery", SA WG2 Meeting #136-AH, S2-2000703, (Jan. 13-17, 2020), 4 pages.

* cited by examiner

800

```
┌─────────────────────────────────────────────────────┐
│ Receive a provisioning server domain or fully       │
│ qualified domain name from a network function       │
│                      801                            │
└─────────────────────────────────────────────────────┘
                          │
                          ▼
┌─────────────────────────────────────────────────────┐
│ Request an application service proxy function to be │
│ allocated to serve an associated onboarding device  │
│                      802                            │
└─────────────────────────────────────────────────────┘
                          │
                          ▼
┌─────────────────────────────────────────────────────┐
│ Cause a configuration message to be provided to the │
│ selected ASPF                                       │
│                      803                            │
└─────────────────────────────────────────────────────┘
                          │
                          ▼
┌─────────────────────────────────────────────────────┐
│ Cause the address of the application service proxy  │
│ function to be provided to the user device          │
│                      803                            │
└─────────────────────────────────────────────────────┘
```

Receive an address for an application service proxy function and port number
1001

Cause a data packet to be sent to the application proxy function to establish a secure transport layer connection to a provisioning server fully qualified domain name
1002

FIG. 10

(54) RESTRICTING ONBOARD TRAFFIC

TECHNOLOGICAL FIELD

An example embodiment relates generally to wireless communications and, more particularly, but not exclusively, to restricting onboarding traffic within communication networks such as standalone public networks.

BACKGROUND

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks. Sixth generation (6G) technology further builds off 5G technology to provide high yield increased processing speeds.

BRIEF SUMMARY

A method, apparatus, and computer program product are disclosed restricting onboarding traffic within a communication network, such as a standalone non-public network. In this regard, the method, apparatus and computer program product are configured to generate one or more traffic filter rules for a traffic filter set. In some embodiments, these traffic filter rules may be generated based at least in part on a domain name service query response information. These traffic filter rules may be provided to a user plane function, which may then enforce said traffic filter rules for a particular user device.

In an example embodiment, a method is provided that includes generating one or more traffic filter rules for a traffic filter set, wherein the one or more traffic filter rules are generated based at least in part on domain name service query and a domain name service response information related to one or more user device originated domain name service queries. The method may further include causing a user plane function to be provided with the one or more traffic filter rules.

In some embodiments, the method may further include receiving a provisioning server domain name or fully qualified domain name from a network function in response to a user device request to onboard with an onboarding standalone non-public network or being configured with one or many provisioning server fully qualified domain names. The method may further include selecting a network function based at least in part on the received provisioning server fully qualified domain name. The method may further include causing the selected network function to be provided with an address for the user device and provisioning server fully qualified domain name.

In some embodiments, the method may further include receiving a notification from the selected network function, wherein the notification includes an internet protocol address as resolved by a domain name service query performed by the user device. The method may further include verifying the fully qualified domain name included in the notification matches the provisioning server fully qualified domain name as received from the network function.

In some embodiments, the method may further include issuing a domain name server query for the provisioning server fully qualified domain name.

In some embodiments, the method may further include invoking a network function to issue a domain name server query for the provisioning server fully qualified domain name.

In some embodiments, the method may further include determining one or more provisioning parameters for a particular user device, wherein, the one or more traffic filter rules for a traffic filter set or traffic detection rules are generated based at least in part on the determined one or more provisioning parameters. In some embodiments, the one or more provisioning parameters include at least one of a device type, device model, specific provisioning protocol supported by the user device, or preferred provisioning protocol.

In some embodiments, the one or more traffic filter rules includes verifying that the resolved internet protocol address belongs to a list or a range of allowed internet protocol addresses for the provisioning server domain or fully qualified domain name. In some embodiments, the invoked network function comprises the selected edge application server discovery function.

In an example embodiment, an apparatus is provided with means for generating one or more traffic filter rules for a traffic filter set, wherein the one or more traffic filter rules are generated based at least in part on domain name service query and a domain name service response information related to one or more user device originated domain name service queries. The apparatus may further include means for causing a user plane function to be provided with the one or more traffic filter rules.

In some embodiments, the apparatus may further include means for receiving a provisioning server domain or fully qualified domain name from a network function in response to a user device request to onboard with an onboarding standalone non-public network or being configured with one or many provisioning server fully qualified domain names. The apparatus may further include means for selecting a network function based at least in part on the received provisioning server fully qualified domain name. The apparatus may further include means for causing the selected network function to be provided with an address for the user device and provisioning server fully qualified domain name.

In some embodiments, the apparatus may further include means for receiving a notification from the selected network function, wherein the notification includes an internet protocol address as resolved by a domain name service query performed by the user device. The apparatus may further include means for verifying the fully qualified domain name included in the notification matches the provisioning server fully qualified domain name as received from the network function.

In some embodiments, the apparatus may further include means for issuing a domain name server query for the provisioning server fully qualified domain name.

In some embodiments, the apparatus may further include means for invoking a network function to issue a domain name server query for the provisioning server fully qualified domain name.

In some embodiments, the apparatus may further include means for determining one or more provisioning parameters for a particular user device, wherein, the one or more traffic filter rules for a traffic filter set or traffic detection rules are generated based at least in part on the determined one or more provisioning parameters. In some embodiments, the one or more provisioning parameters include at least one of a device type, device model, specific provisioning protocol supported by the user device, or preferred provisioning protocol.

In some embodiments, the one or more traffic filter rules includes verifying that the resolved internet protocol address belongs to a list or a range of allowed internet protocol addresses for the provisioning server domain or fully qualified domain name. In some embodiments, the invoked network function comprises the selected edge application server discovery function.

In an example embodiment, an apparatus is provided including processing circuitry and at least one memory including computer program code with the at least one memory and the computer program code configured to, with the processing circuitry, cause the apparatus at least to generate one or more traffic filter rules for a traffic filter set, wherein the one or more traffic filter rules are generated based at least in part on a domain name service query response related to one or more user device originated domain name service queries. The at least one memory and the computer program code may further be configured to, with the processing circuitry, cause the apparatus at least to cause a user plane function to be provided with the one or more traffic filter rules.

The at least one memory and the computer program code may further be configured to, with the processing circuitry, cause the apparatus at least to receive a provisioning server domain or fully qualified domain name from a network function in response to a user device request to onboard with an onboarding standalone non-public network or being configured with one or many provisioning server fully qualified domain names. The at least one memory and the computer program code may further be configured to, with the processing circuitry, cause the apparatus at least to select a network function based at least in part on the received provisioning server fully qualified domain name. The at least one memory and the computer program code may further be configured to, with the processing circuitry, cause the apparatus at least to cause the selected network function to be provided with an address for the user device and provisioning server fully qualified domain name.

The at least one memory and the computer program code may further be configured to, with the processing circuitry, cause the apparatus at least to receive a notification from the selected network function, wherein the notification includes an internet protocol address as resolved by a domain name service query performed by the user device. The at least one memory and the computer program code may further be configured to, with the processing circuitry, cause the apparatus at least to verify the fully qualified domain name included in the notification matches the provisioning server fully qualified domain name as received from the network function.

The at least one memory and the computer program code may further be configured to, with the processing circuitry, cause the apparatus at least to issue a domain name server query for the provisioning server fully qualified domain name.

The at least one memory and the computer program code may further be configured to, with the processing circuitry, cause the apparatus at least to invoke a network function to issue a domain name server query for the provisioning server fully qualified domain name.

The at least one memory and the computer program code may further be configured to, with the processing circuitry, cause the apparatus at least to determine one or more provisioning parameters for a particular user device, wherein, the one or more traffic filter rules for a traffic filter set or traffic detection rules are generated based at least in part on the determined one or more provisioning parameters.

In an example embodiment, a computer program product is provided that includes at least one non-transitory computer-readable storage medium having computer executable program code instructions stored therein with the computer executable program code instructions including program code instructions configured, upon execution, to generate one or more traffic filter rules for a traffic filter set, wherein the one or more traffic filter rules are generated based at least in part on a domain name service query response related to one or more user device originated domain name service queries. The computer executable program code instructions include program code instructions further configured, upon execution, to cause the apparatus at least to cause a user plane function to be provided with the one or more traffic filter rules.

The computer executable program code instructions include program code instructions further configured, upon execution, to receive a provisioning server domain or fully qualified domain name from a network function in response to a user device request to onboard with an onboarding standalone non-public network or being configured with one or many provisioning server fully qualified domain names. The computer executable program code instructions include program code instructions further configured, upon execution, to select a network function based at least in part on the received provisioning server fully qualified domain name The computer executable program code instructions include program code instructions further configured, upon execution, to cause the selected network function to be provided with an address for the user device and provisioning server fully qualified domain name.

The computer executable program code instructions include program code instructions further configured, upon execution, to receive a notification from the selected network function, wherein the notification includes an internet protocol address as resolved by a domain name service query performed by the user device. The computer executable program code instructions include program code instructions further configured, upon execution, to verify the fully qualified domain name included in the notification matches the provisioning server fully qualified domain name as received from the network function.

The computer executable program code instructions include program code instructions further configured, upon execution, to issue a domain name server query for the provisioning server fully qualified domain name.

The computer executable program code instructions include program code instructions further configured, upon execution, to invoke a network function to issue a domain name server query for the provisioning server fully qualified domain name.

The computer executable program code instructions include program code instructions further configured, upon execution, to determine one or more provisioning parameters for a particular user device, wherein, the one or more traffic filter rules for a traffic filter set or traffic detection rules are generated based at least in part on the determined one or more provisioning parameters.

In another example embodiment, a method is provided that includes receiving a provisioning server fully qualified domain name from a network function in response to a user device request to onboard with an onboarding standalone non-public network. The method may further include requesting an application service proxy function to be allocated to serve an associated onboarding user device. The method may further include causing the address of the application service proxy function to be provided to the user device.

In some embodiments, the method further includes configuring a user plane function to allow the user device to communicate with the application service proxy function internet protocol address and port number, and with a local domain name server.

In some embodiments, the method further includes causing a configuration message to be provided to the selected application service proxy function, wherein the configuration message is indicative of which fully qualified domain names the user device is allowed to use to connect to.

In some embodiments, the address of the application service proxy function is caused to be provided to the user device using a protocol configuration option, wherein the protocol configuration option includes an application server proxy function internet protocol address and port number. In some embodiments, the user plane function is further configured to drop any data packets received from the user device or addressed to the user device which are not directed to the configured application service proxy function internet protocol address and port number.

In another example embodiment, an apparatus is provided with means for receiving a provisioning server fully qualified domain name from a network function in response to a user device request to onboard with an onboarding standalone non-public network. The apparatus may further include means for requesting an application service proxy function to be allocated to serve an associated onboarding user device. The apparatus may further include means for causing the address of the application service proxy function to be provided to the user device.

In some embodiments, the apparatus further includes means for configuring a user plane function to allow the user device to communicate with the application service proxy function internet protocol address and port number, and with a local domain name server.

In some embodiments, the apparatus further includes means for causing a configuration message to be provided to the selected application service proxy function, wherein the configuration message is indicative of which fully qualified domain names the user device is allowed to use to connect to.

In some embodiments, the address of the application service proxy function is caused to be provided to the user device using a protocol configuration option, wherein the protocol configuration option includes an application server proxy function internet protocol address and port number. In some embodiments, the user plane function is further configured to drop any data packets received from the user device or addressed to the user device which are not directed to the configured application service proxy function internet protocol address and port number.

In an example embodiment, an apparatus is provided including processing circuitry and at least one memory including computer program code with the at least one memory and the computer program code configured to, with the processing circuitry, cause the apparatus at least to receive a provisioning server fully qualified domain name from a network function in response to a user device request to onboard with an onboarding standalone non-public network. The at least one memory and the computer program code may further be configured to, with the processing circuitry, cause the apparatus at least to request an application service proxy function to be allocated to serve an associated onboarding user device. the at least one memory and the computer program code configured to, with the processing circuitry, cause the apparatus at least to cause the address of the application service proxy function to be provided to the user device.

The at least one memory and the computer program code configured to, with the processing circuitry, cause the apparatus at least to configure a user plane function to allow the user device to communicate with the application service proxy function internet protocol address and port number, and with a local domain name server.

The at least one memory and the computer program code configured to, with the processing circuitry, cause the apparatus at least to cause a configuration message to be provided to the selected application service proxy function, wherein the configuration message is indicative of which fully qualified domain names the user device is allowed to use to connect to.

In an example embodiment, a computer program product is provided that includes at least one non-transitory computer-readable storage medium having computer executable program code instructions stored therein with the computer executable program code instructions including program code instructions configured, upon execution, to receive a provisioning server fully qualified domain name from a network function in response to a user device request to onboard with an onboarding standalone non-public network. The computer executable program code instructions including program code instructions may further be configured, upon execution, to request an application service proxy function to be allocated to serve an associated onboarding user device. The computer executable program code instructions including program code instructions may further be configured, upon execution, to cause the address of the application service proxy function to be provided to the user device.

The computer executable program code instructions including program code instructions may further be configured, upon execution, to configure a user plane function to allow the user device to communicate with the application service proxy function internet protocol address and port number, and with a local domain name server.

The computer executable program code instructions including program code instructions may further be configured, upon execution, to cause a configuration message to be provided to the selected application service proxy function, wherein the configuration message is indicative of which fully qualified domain names the user device is allowed to use to connect to.

In another example embodiment, a method is provided that includes receiving an incoming data packet from the user device. The method may further include, in response to receipt of the incoming data packet, generating a domain name system query for the provisioning server fully qualified domain name. The method may further include establishing a secure transport layer connection from the user device to the provisioning service fully qualified domain name.

In some embodiments, the method further includes translating a source internet protocol address and a destination internet protocol address included in the incoming data packet to a different source internet protocol address and different destination internet protocol address.

In some embodiments, the configuration message further includes at least one of the parameters of a communication timer duration parameter, a maximum allowed bit parameter, or maximum bitrate parameter.

In another example embodiment, an apparatus is provided that includes means for receiving an incoming data packet from the user device. The apparatus may further include means for, in response to receipt of the incoming data packet, generating a domain name system query for the provisioning server fully qualified domain name. The apparatus may further include means for establishing a secure transport layer connection from the user device to the provisioning service fully qualified domain name.

In some embodiments, the apparatus may further include means for translating a source internet protocol address and a destination internet protocol address included in the incoming data packet to a different source internet protocol address and different destination internet protocol address.

In some embodiments, the configuration message further includes at least one of the parameters of a communication timer duration parameter, a maximum allowed bit parameter, or maximum bitrate parameter.

In an example embodiment, an apparatus is provided including processing circuitry and at least one memory including computer program code with the at least one memory and the computer program code configured to, with the processing circuitry, cause the apparatus at least to receive, from a network function, a configuration message, wherein the configuration message includes a user device address and a provisioning server fully qualified domain name. The computer program code with the at least one memory and the computer program code further configured to, with the processing circuitry, cause the apparatus at least to receive an incoming data packet from the user device. The computer program code with the at least one memory and the computer program code further configured to, with the processing circuitry, cause the apparatus to, in response to receipt of the incoming data packet, generate a domain name system query for the provisioning server fully qualified domain name. The computer program code with the at least one memory and the computer program code further configured to, with the processing circuitry, cause the apparatus to establish a secure transport layer connection from the user device to the provisioning service fully qualified domain name.

The computer program code with the at least one memory and the computer program code further configured to, with the processing circuitry, cause translate a source internet protocol address and a destination internet protocol address included in the incoming data packet to a different source internet protocol address and different destination internet protocol address.

In an example embodiment, a computer program product is provided that includes at least one non-transitory computer-readable storage medium having computer executable program code instructions stored therein with the computer executable program code instructions including program code instructions configured, upon execution, to receive, from a network function, a configuration message, wherein the configuration message includes a user device address and a provisioning server fully qualified domain name. The computer executable program code instructions including program code instructions may further be configured, upon execution, to receive an incoming data packet from the user device. The computer executable program code instructions including program code instructions may further be configured, upon execution, to in response to receipt of the incoming data packet, generate a domain name system query for the provisioning server fully qualified domain name. The computer executable program code instructions including program code instructions may further be configured, upon execution, to establish a secure transport layer connection from the user device to the provisioning service fully qualified domain name.

The computer executable program code instructions including program code instructions may further be configured, upon execution, to translate a source internet protocol address and a destination internet protocol address included in the incoming data packet to a different source internet protocol address and different destination internet protocol address.

In another example embodiment, a method is provided that includes receiving an address for an application service proxy function and a port number. The method may further include causing a data packet to be sent to the application service proxy function to establish a secure transport layer connection to a provisioning server fully qualified domain name.

In some embodiments, the transport layer security connection to the provisioning server fully qualified domain name is performed using a http connect method. In some embodiments, the data packet includes the application service proxy function and a port number. In some embodiments, the address for the requested application service proxy function is received using a protocol configuration option, wherein the protocol configuration option includes an application server proxy function internet protocol address and port number.

In another example embodiment, an apparatus is provided that includes means for receiving an address for an application service proxy function and a port number. The apparatus may further include means for causing a data packet to be sent to the application service proxy function to establish a secure transport layer connection to a provisioning server fully qualified domain name.

In an example embodiment, an apparatus is provided including processing circuitry and at least one memory including computer program code with the at least one memory and the computer program code configured to, with the processing circuitry, cause the apparatus at least to receive an address for an application service proxy function and a port number. The at least one memory and the computer program code may further be configured to, with the processing circuitry, cause the apparatus at least to cause a data packet to be sent to the application service proxy function to establish a secure transport layer connection to a provisioning server fully qualified domain name.

In an example embodiment, a computer program product is provided that includes at least one non-transitory computer-readable storage medium having computer executable program code instructions stored therein with the computer executable program code instructions including program code instructions configured, upon execution, to receive an address for an application service proxy function and a port number. The computer executable program code instructions including program code instructions may further be configured, upon execution, to cause a data packet to be sent to the application service proxy function to establish a secure transport layer connection to a provisioning server fully qualified domain name.

In another example embodiment, a method is provided that includes receiving at least one of a provisioning server fully qualified domain name or a user device identifier in response to a user device request to onboard with an onboarding standalone non-public network. The method may further include determining a tunnel endpoint in a subscription owning standalone non-public network or another network. The method may further include instructing a user plane function to establish a tunnel linked to one or several user device packet data unit sessions.

In some embodiments, the method may further include deriving the tunnel endpoint and associated security credentials. In some embodiments, the method may further include receiving the tunnel endpoint address and associated security credentials from a network entity.

In some embodiments, the subscription owning standalone non-public network address is determined based at least in part on the provisioning server fully qualified domain name or the domain name included in the provisioning server fully qualified domain name.

In another example embodiment, an apparatus is provided that includes means for receiving at least one of a provisioning server fully qualified domain name or a user device identifier in response to a user device request to onboard with an onboarding standalone non-public network. The apparatus may further include means for determining a tunnel endpoint in a subscription owning standalone non-public network or another network. The apparatus may further include means for instructing a user plane function to establish a tunnel linked to one or several user device packet data unit sessions.

In some embodiments, the apparatus may further include means for deriving the tunnel endpoint and associated security credentials. In some embodiments, the apparatus may further include means for receiving the tunnel endpoint address and associated security credentials from a network entity.

In an example embodiment, an apparatus is provided including processing circuitry and at least one memory including computer program code with the at least one memory and the computer program code configured to, with the processing circuitry, cause the apparatus at least to receive at least one of a provisioning server fully qualified domain name or a user device identifier in response to a user device request to onboard with an onboarding standalone non-public network. The at least one memory and the computer program code may further be configured to, with the processing circuitry, cause the apparatus at least to determine a tunnel endpoint in a subscription owning standalone non-public network or another network. The at least one memory and the computer program code may further be configured to, with the processing circuitry, cause the apparatus at least to instruct a user plane function to establish a tunnel linked to one or several user device packet data unit sessions.

The at least one memory and the computer program code may further be configured to, with the processing circuitry, cause the apparatus at least to derive the tunnel endpoint and associated security credentials. The at least one memory and the computer program code may further be configured to, with the processing circuitry, cause the apparatus at least to receive the tunnel endpoint address and associated security credentials from a network entity.

In an example embodiment, a computer program product is provided that includes at least one non-transitory computer-readable storage medium having computer executable program code instructions stored therein with the computer executable program code instructions including program code instructions configured, upon execution, to receive at least one of a provisioning server fully qualified domain name or a user device identifier in response to a user device request to onboard with an onboarding standalone non-public network. The computer executable program code instructions stored therein with the computer executable program code instructions including program code instruc-tions may be further configured, upon execution, to determine a tunnel endpoint in a subscription owning standalone non-public network or another network. The computer executable program code instructions stored therein with the computer executable program code instructions including program code instructions may be further configured, upon execution, to instruct a user plane function to establish a tunnel linked to one or several user device packet data unit sessions.

The computer executable program code instructions stored therein with the computer executable program code instructions including program code instructions may be further configured, upon execution, to derive the tunnel endpoint and associated security credentials. The computer executable program code instructions stored therein with the computer executable program code instructions including program code instructions may be further configured, upon execution, to receive the tunnel endpoint address and associated security credentials from a network entity.

BRIEF DESCRIPTION OF THE DRAWINGS

Figure 1:
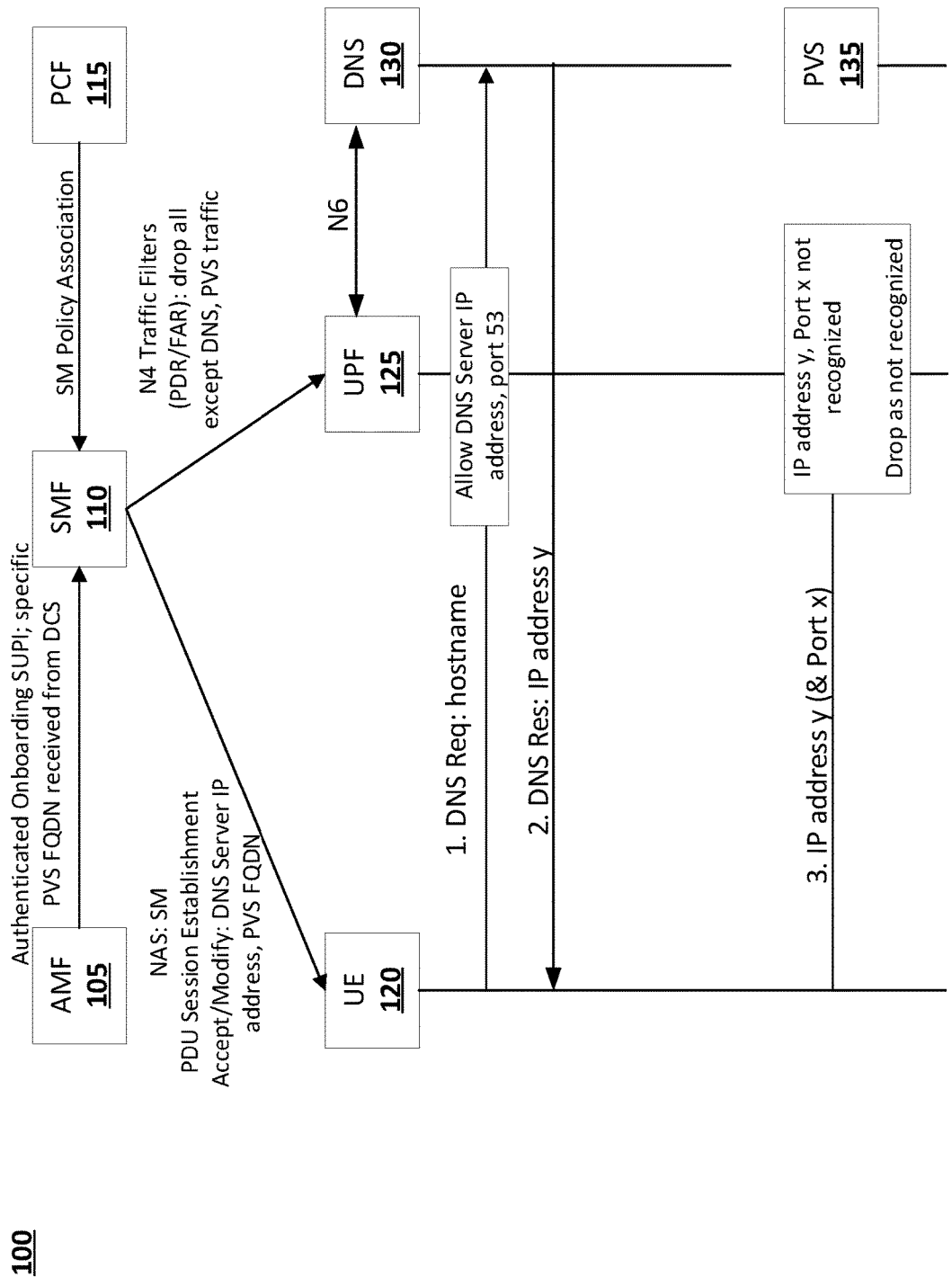
Figure 2:
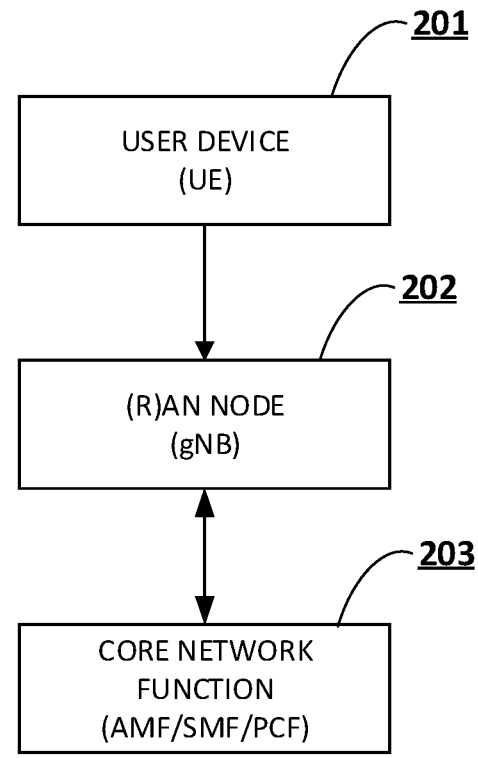
Figure 3:
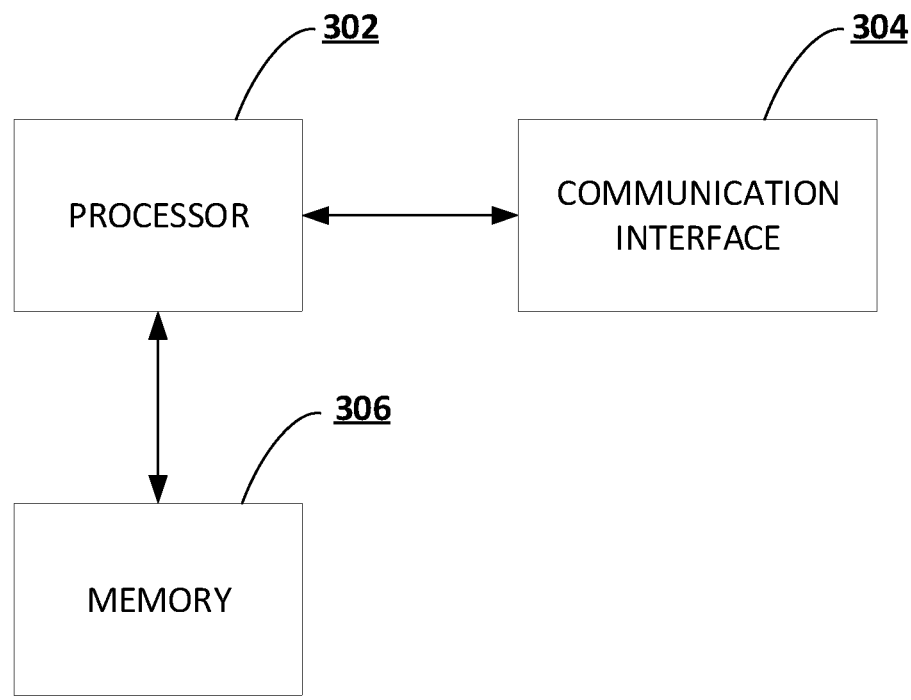
Figure 4:
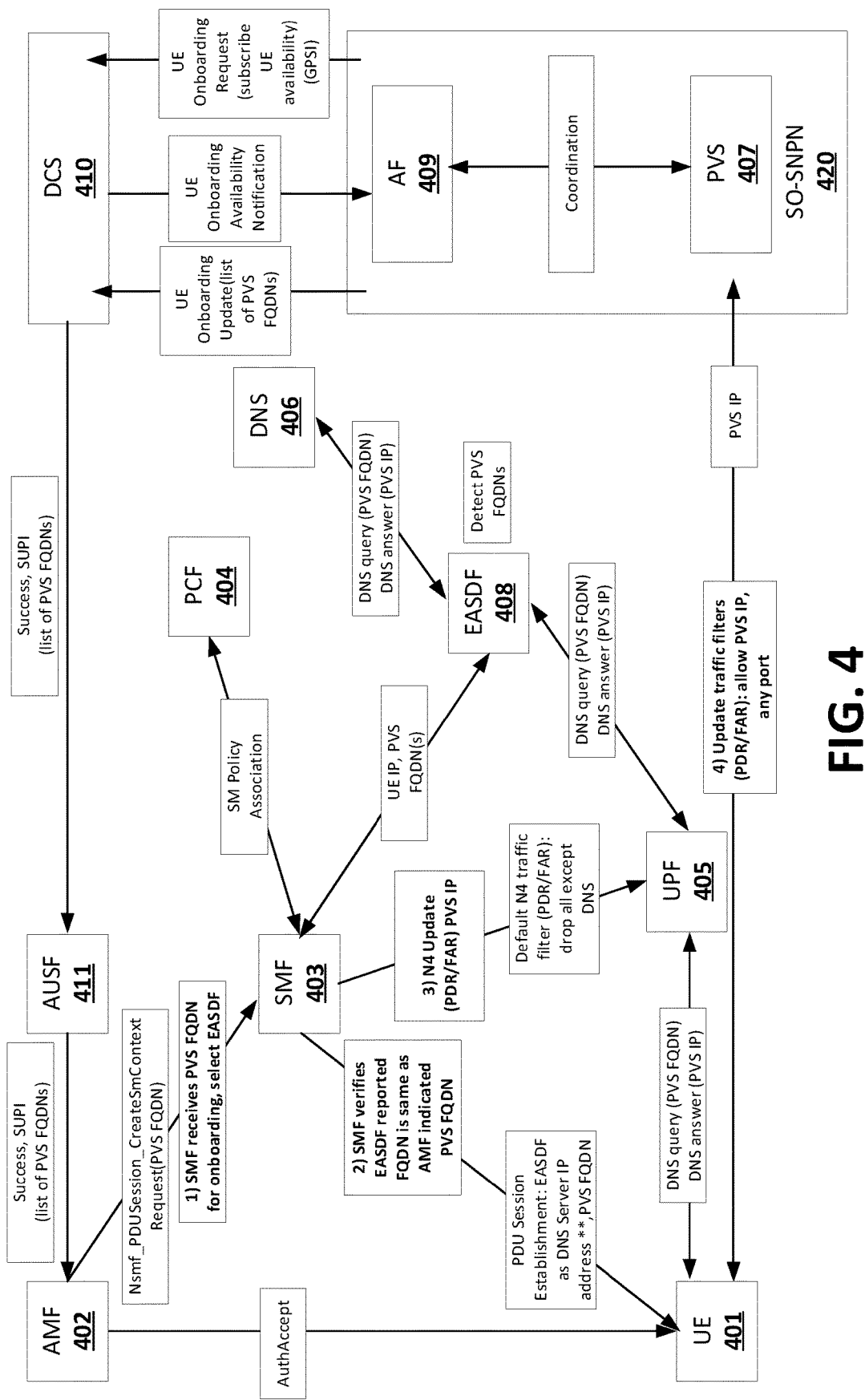
Figure 5:
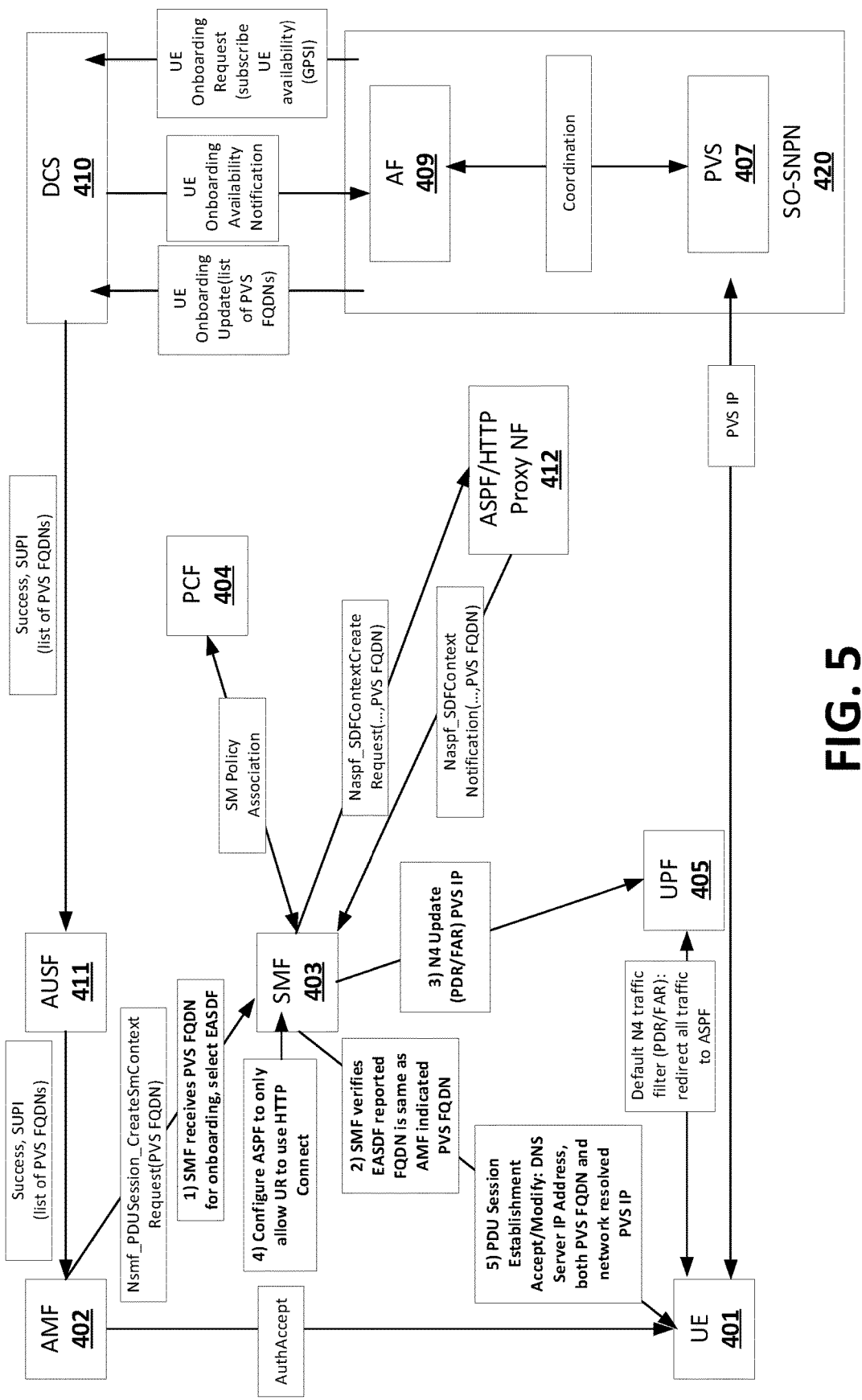
Figure 6:
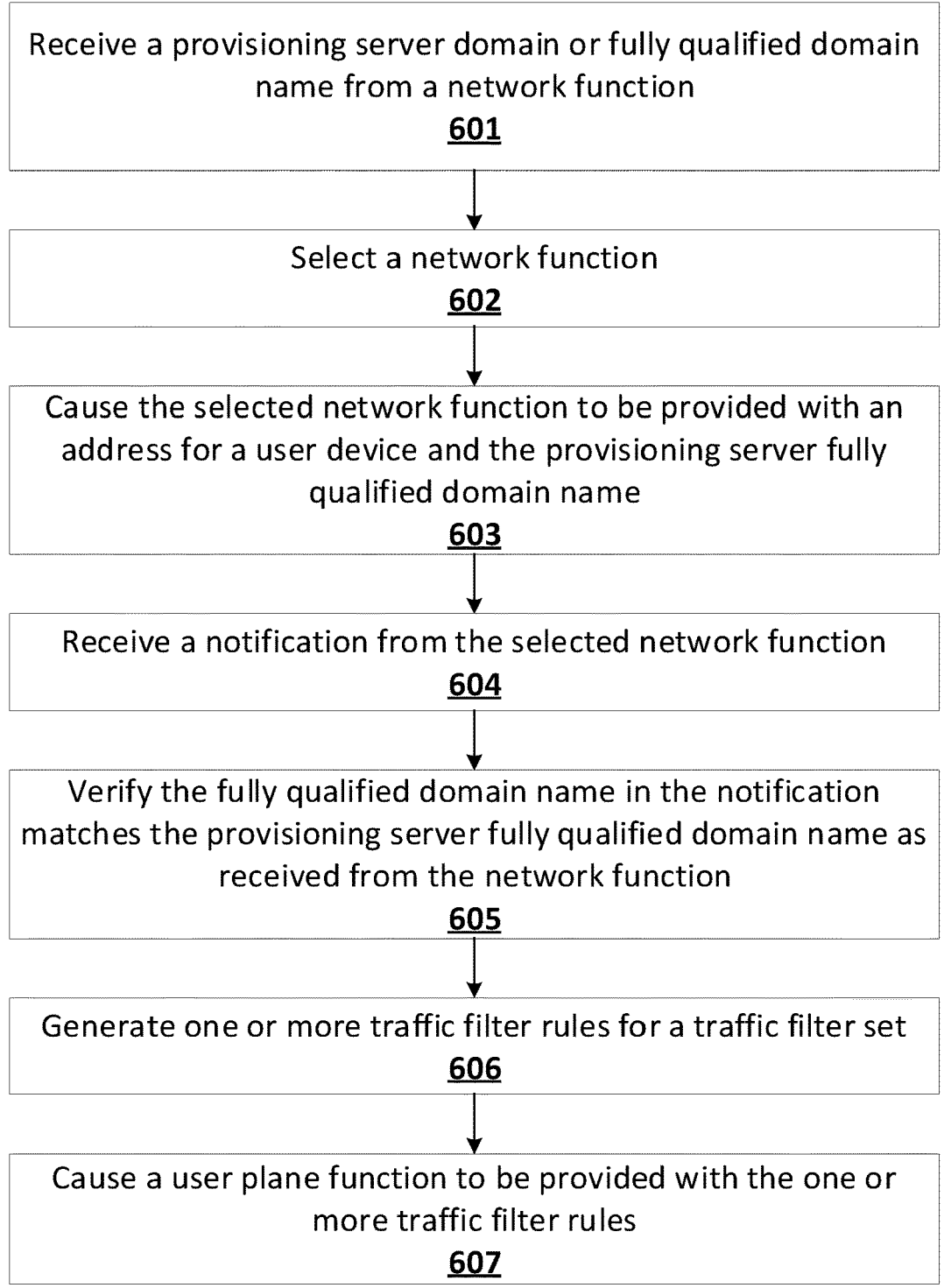
Figure 7:
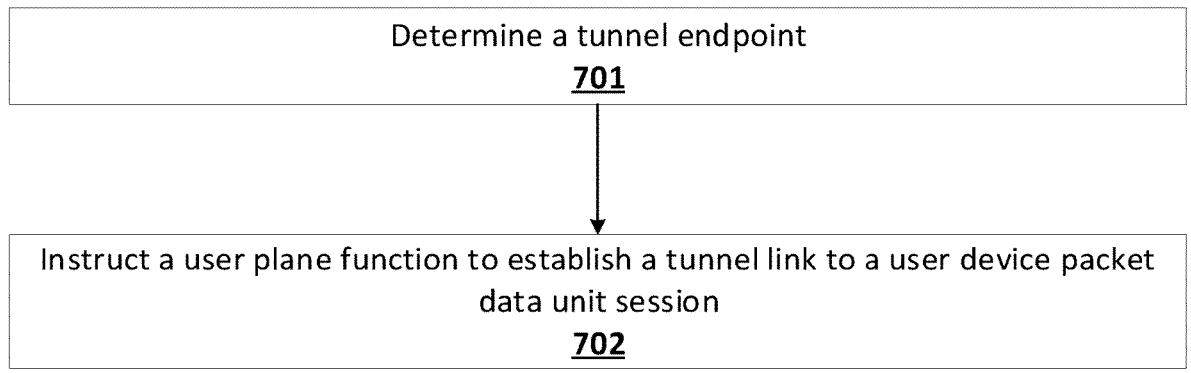
Figure 9:
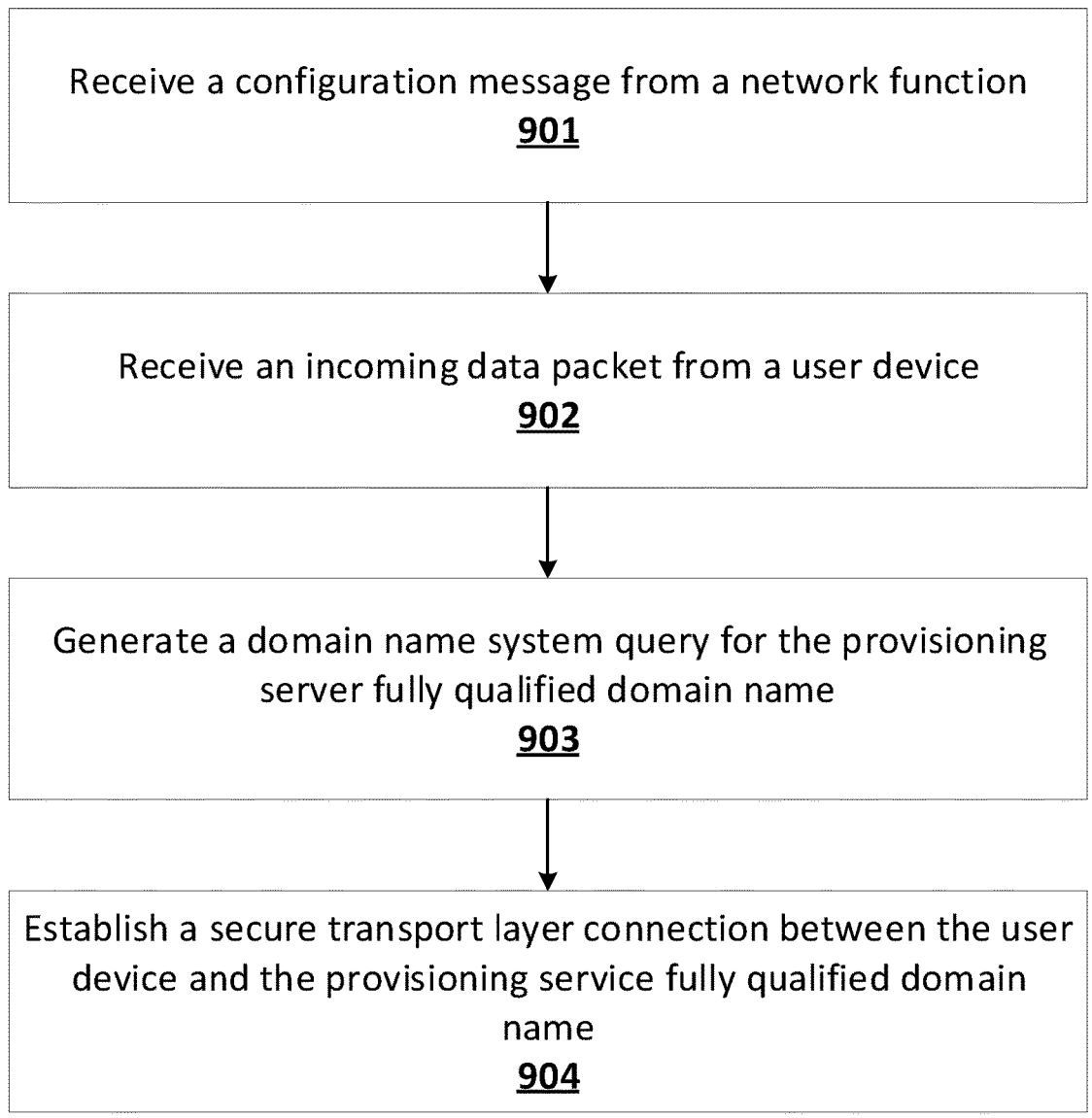

Having thus described certain example embodiments of the present disclosure in general terms, reference will hereinafter be made to the accompanying drawings, which are not necessarily drawn to scale, and wherein:

FIG. 1 depicts an on-boarding standalone non-public network in an illustrative embodiment;

FIG. 2 shows a communication system in an illustrative embodiment;

FIG. 3 is a block diagram of an apparatus that may be specifically configured in accordance with an example embodiment of the present disclosure;

FIG. 4 shows an example onboarding standalone non-public network in an illustrative embodiment;

FIG. 5 shows an example onboarding standalone non-public network with an application service proxy function in an illustrative embodiment;

FIG. 6 illustrates a flow diagram for generating one or more traffic filter rules in an illustrative embodiment;

FIG. 7 illustrates a flow diagram for instructing a user plane to establish a tunnel link in an illustrative embodiment;

FIG. 8 illustrates a flow diagram for using a proxy path in a user plane function in an illustrative embodiment;

FIG. 9 illustrates a flow diagram for resolving domain name system requests in a user plane function in an illustrative embodiment; and FIG. 10 illustrates an example configuration for causing a data packet to be sent in an illustrative embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

The evolution of new communication technologies such as fifth generation (5G) and sixth generation (6G) have improved upon existing technologies such as second generation (2G) technologies, third generation (3G) technologies, fourth generation (4G) technologies and long term evolution (LTE) technologies and has thus resulted in improved network connectivity. In order to accommodate diverse use cases within such communication networks, a standalone non-public network (SNPN) may enable the deployment of the communication networks, such as a 5G system (5GS), for private use for a particular facility, institution, computing entity grouping and/or the like. A particular SNPN may be identified by a combination of a public land mobile network (PLMN) identifier and a network identifier (NID). The SNPN may allow a user device, also referenced as user equipment (UE), to access an onboarding network (ONN) based on default credentials pre-configured on the UE for the purpose of remote provision of the UE with a subscription owning SNPN (SO-SNPN) credentials and subscription data to enable regular access for the UE to the SNPN.

Typically, a UE will establish a packet data unit (PDU) session in the ONN to access a provisioning server (PVS). The PVS may provide then SO-SNPN credentials and subscription data to the UE. Once remote provisioned with SO-SNPN credentials, the UE may need to select or re-select and register or re-register with a desired SNPN. The onboarding SNPN (ON-SNPN) may or may not be the same SNPN as the SNPN providing onboarding access and enabling remote provisioning of the UE registered for onboarding.

The UE default credentials provided during onboarding may be defined as information configured to make the UE uniquely identifiable and verifiably secure to perform UE onboarding such that the UE may use these default credentials for ON-SNPN registration and PVS communication. A UE will additionally provide an onboarding subscription concealed identifier (SUCI) derived from an onboarding subscription permanent identifier (SUPI). The SUCI and/or SUPI of the UE may uniquely identify the UE and be derived from the default UE credentials. If a UE is equipped with a universal subscriber identity module (USIM) configured with default public land mobile network (PLMN) credentials, the UE selects a PLMN as the ONN and establishes a connection with that PLMN. In such an instance, the PLMN credentials serve as default credentials.

A default credentials server (DCS) may perform a primary UE authentication based on the default UE credentials provided during a UE onboarding procedure with an ON-SNPN. The ON-SNPN may determine the corresponding DCS identity, address, and/or domain based on the SUCI provided by the UE during onboarding. As part of the primary authentication for onboarding a UE, the DCS may provide the UE and ONN a PVS addressed used by the UE for remote provisioning by providing a PVS fully qualified domain name (FQDN) to an access and mobility management function (AMF) and/or providing a PVS FQDN as provided by a network exposure function (NEF) from a SO-SNPN to ON-SNPN.

During remote provisioning, an onboarding registered UE requests a PDU session from an ONN without providing a data network name (DNN) and/or single network slice selection assistance information (S-NSSAI). The onboarding network provides a restricted PDU session for remote provisioning of the UE via a user plane with a pre-configured S-NSSAI(s) and DNN(s) used for onboarding in the ONN. A restricted PDU session allows the UE to only access the PVS such that the UE is not allowed to connect to other destinations outside or external to the PVS. The accessible PVS may be specific to an onboarding UE and dynamically provided to the ONN as part of the UE primary authentication. The PVS may interact with the SO-SNPN for the provision of SNPN credentials and other data in the UE to enable access to a desired SNPN. The PVS endpoint may be characterized by a tuple including an internet protocol (IP) address, port, and protocol. The PVS address may be represented in a predefined format, such as a FQDN format, which may be resolved to an IP address and port number by the UE using a domain name service (DNS) prior to the UE sending any IP traffic to the PVS.

An ON-SNPN may restrict a UE's IP traffic to only allowed destinations (IP endpoint(s)) to prevent misuse of a PDU session, such as by preventing any IP traffic associated with risk and/or free of charge traffic. As part of the PDU session establishment, a session management function (SMF) and/or policy control function (PCF) may instruct a user plane function (UPF) to drop any IP traffic except to or from legitimate endpoints, such as PVS or DNS server endpoints.

As shown in FIG. 1, a communication network 100 is depicted which illustrates conventional IP traffic determinations within an ONN. As shown in FIG. 1 a UE 120 may establish a non-access stratum (NAS) PDU session with an SMF 110. Additionally, the SMF 110 may be in communication with AMF 105 and the AMF 105 may provide the SMF 110 with an authenticated onboarding SUPI for the UE 120 and specific PVS FQDN as received from a DCS (not shown). The SMF 110 may also be in communication with a PCF 115 which may provide the SMF 110 with session management policy association, which may describe one or more policies associated with the particular SNPN. In turn, the SMF 110 may provide the UPF 125 with a set of traffic filters. This set of traffic filters may define one or more packet detection rules (PDRs) and/or forwarding action rules (FARs). The set of traffic filters may also cause the UPF 125 to drop all traffic except recognized DNS and/or PVS traffic. The SMF 110 may also provide the UE 120 with the NAS PDU session establishment, which may include a DNS server IP address (indicative of DNS 130) and PVS FQDN.

Once the UE 120 receives a NAS PDU session establishment from SMF 110, the UE 120 may provide a DNS request describing a hostname to DNS 130, which may be the DNS described by the DNS server IP address in the NAS PDU session establishment. The DNS 130 may provide a DNS resolution with a resolved IP address. The UE 120 may then attempt to provide a data request describing the resolved IP address and port number to a PVS 135. However, prior to the data request being provided to the PVS 135, the UPF 125 may intercept the request and determine whether the data follows the one or more traffic rules defined by the set of traffic filters. In an instance the data request does not follow the one or more traffic rules, the UPF 125 may drop the data request.

When a PVS address is in FQDN form, the ON-SNPN may not be able to determine proper traffic filters based on the received FQDN as UEs may receive different DNS resolution results for the same FQDN. For example, a single hostname may resolve to many IP addresses to facilitate fault tolerance and load distribution to multiple server instances across an enterprise and/or global internet.

Currently, certain data networks in general may use proprietary standalone solutions that may be used to implement traffic restrictions by a network address tunnel gateway (NAT-GW) issuing DNS request(s) on a set of known/ preconfigured FQDNs used by clients. A standalone NAT-GW, which is not specified in the third-generation partnership project (3GPP), is behind a UPF on an N6 interface. However, such a NAT-GW has no interaction with the 5GC, and therefore cannot be aware of dynamic FQDNs received at ONN during onboarding and cannot be aware of which FQDN used by UE for onboarding is legitimate. Furthermore, a hypertext transfer protocol (HTTP) proxy can restrict HTTP or transport layer security (TLS) traffic to specific uniform resource identifiers (URIs) or FQDNs by configuration but the HTTP proxy also needs to be aware of which destinations are allowed. Additionally, there is no interface standardized between 3GPP control plane functions and HTTP proxy functionality.

Therefore, it may be beneficial to determine and provide one or more traffic filter rules for a traffic filter set based on one or more PVS FQDNs and the FQDNS as resolved by a UE and/or network function. By determining a traffic filter set based on the one or more PVS FQDNs, this allows a ON-SNPN to restrict UE IP traffic more efficiently and effectively without dropping traffic which includes FQDNs that should be authenticated.

FIG. 2 shows a communication system 200 within which certain illustrative embodiments are to be implemented. However, it is to be appreciated that embodiments are not limited to the network configurations illustrated herein or otherwise described below. It is to be understood that the elements shown in communication system 200 are intended to represent a primary function provided within the system. As such, the blocks shown in FIG. 2 reference specific elements in 5G networks that provide the primary functions. However, other network elements may be used to implement some or all of the primary functions represented. Also, it is to be understood that not all functions of a 5G network are depicted in FIG. 2. Rather, functions that facilitate an explanation of illustrative embodiments are represented.

By way of example, the communication system 200 may be deployed within a radio access architecture. However, the system may be deployed in other applications including within other communication networks including, for example, long term evolution advanced (LTE Advanced, LTE-A), a universal mobile telecommunications system (UMTS) radio access network (UTRAN or E-UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. Any access network eligible to access the 5G core network such as an Un-trusted Non 3GPP access terminated at a Non-3GPP interworking function (N3IWF), a trusted Non-3GPP access terminated at a trusted non-3GPP gateway function (TNGF) or a Wireline access terminated at a wireless access gateway function (W-AGF) may be used instead of the NG RAN/gNB. Moreover, although described herein in conjunction with a 5G core network, the method, apparatus and computer program product of certain example embodiments may be employed in conjunction with other technologies, such as a 6G network or the like.

In the radio access architecture of FIG. 2, user device 201 is configured to be in a wireless connection on one or more communication channels in a cell with a radio access network (RAN) node, such as a gNB. The physical link from a user device 201 to a gNB is called the uplink or reverse link and the physical link from the gNB to the UE is called the downlink or forward link. It should be appreciated that the gNBs, or their functionalities may be implemented by using any node, host, server or access point (AP), etc. suitable for such a usage.

A communications system typically comprises more than one gNB, in which case the gNBs may also be configured to communicate with one another over links, wired or wireless, designed for the purpose. These links may be used for signaling purposes. The gNB is a computing device configured to control the radio resources of the communication system to which the gNB is coupled. The gNB may also be referred to as a base station, an access point or any other type of interfacing device including a relay station capable of operating in a wireless environment. The gNB includes or is coupled to transceiver(s). From the transceivers of the gNB, a connection is provided to an antenna unit that establishes bi-directional radio links to UEs. As such, the transceivers of the gNB and the transceivers of the UEs may include transmitters and receivers configured to communicate via a channel. Although reference is made to a gNB herein, this is by way of example, but not of limitation, as other types of RAN nodes may alternatively be employed.

Accordingly, as shown, communication system 200 comprises UE 201 that communicates, such as via an air interface, with a RAN node 202. The UE 201 may be a mobile station, and such a mobile station may comprise, by way of example, a mobile telephone, a computer, or any other type of communication device. In an LTE-V2X implementation, one or more UEs may deployed in a given vehicle. The term "user device" or "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., a vehicle). The user device 201 may also refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a UE may also be a nearly exclusive uplink only device, of which an example is a camera or video camera loading images or video clips to a network. A UE may also be a device having the capability to operate in an IoT network, which is a scenario in which objects are provided with the ability to transfer data over a network without requiring human-to-human or human-to-computer interaction. The user device (or in some embodiments a layer 3 relay node) is configured to perform one or more user device functionalities. The user device may also be called a subscriber unit, mobile station, remote terminal, access terminal, user terminal or user equipment just to mention but a few names or apparatuses.

In one embodiment, UE 201 is comprised of a Universal Integrated Circuit Card (UICC) and Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key, which are used to identify and authenticate subscribers to access networks. The ME is the user-independent part of the UE and contains terminal equipment (TE) functions and various mobile termination (MT) functions.

The RAN node 202 is illustratively part of a RAN of the communication system 200. In a 5GS network, the RAN node is typically implemented by a gNB. Such an access network may comprise, for example, a plurality of base stations which may include one or more gNBs (which may also be split in a centralized unit (CU) and a distributed unit (DU) part) and/or other RAN node types, such as evolved node Bs (eNBs), node Bs, base stations (BTS) and/or non-3GPP interworking functions (N3IWF), or any other types of access nodes such as WLAN access points, as well as one or more associated radio network control functions. The base stations and radio network control functions may be logically separate entities, but in a given embodiment may be implemented in the same physical network element, such as, for example, a base station router or femto cellular access point. As will be appreciated by one of skill in the art, any variety of RAN nodes and/or access nodes may also implement similar operations, functions, etc.

In some example embodiments, the RAN node 202 is operatively coupled to a core network function 203, such as via an NG interface. The network function 203 may include an AMF, SMF, or any other core network function. A core network function may be an element in the core network (CN) part of the communication network 200 that is responsible for one or more associated operations. The core network function may serve as a NAS termination point for NAS layer security. Each NAS termination point may be uniquely identified using a NAS temporary identifier.

One example of an apparatus 300 that may be configured to function as a network entity, such as a UE, a network function such as an AMF, SMF, PCF, Application Service Proxy Function (ASPF) or the like, is depicted in FIG. 3. As shown in FIG. 3, the apparatus 300 includes, is associated with or is in communication with processing circuitry 302, a memory 306 and a communication interface 304. The processing circuitry 302 may be in communication with the memory device via a bus for passing information among components of the apparatus 300. The memory device 306 may be non-transitory and may include, for example, one or more volatile and/or non-volatile memories. In other words, for example, the memory device 306 may be an electronic storage device (e.g., a computer readable storage medium) comprising gates configured to store data (e.g., bits) that may be retrievable by a machine (e.g., a computing device like the processing circuitry). The memory device 306 may be configured to store information, data, content, applications, instructions, or the like for enabling the apparatus to carry out various functions in accordance with an example embodiment of the present disclosure. For example, the memory device 306 could be configured to buffer input data for processing by the processing circuitry 302. Additionally or alternatively, the memory device 306 could be configured to store instructions for execution by the processing circuitry 302.

The apparatus 300 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 302 may be embodied in a number of different ways. For example, the processing circuitry 302 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 302 may be configured to execute instructions stored in the memory device 306 or otherwise accessible to the processing circuitry 302. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry 302 is embodied as an executor of instructions, the instructions may specifically configure the processor to perform the algorithms and/or operations described herein when the instructions are executed. However, in some cases, the processing circuitry 302 may be a processor of a specific device (e.g., an image or video processing system) configured to employ an embodiment of the present invention by further configuration of the processing circuitry by instructions for performing the algorithms and/or operations described herein. The processing circuitry 302 may include, among other things, a clock, an arithmetic logic unit (ALU) and logic gates configured to support operation of the processing circuitry.

The communication interface 304 may be any means such as a device or circuitry embodied in either hardware or a combination of hardware and software that is configured to receive and/or transmit data, including media content in the form of video or image files, one or more audio tracks or the like. In this regard, the communication interface 304 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 4 illustrates communications exchanged between various computing entities within a ON-SNPN network 400. As illustrated in FIG. 4, a traffic filter set may be generated based on UE originated DNS queries.

In operation 1 of FIG. 4, an AMF 402 may provide an SMF 403 with a PVS FQDN used for onboarding a UE 401. The AMF 402 may receive a PVS FQDN from any network function. In some embodiments, the AMF 402 may receive the PVS FQDN from a DCS 410 via an authentication server function (AUSF) 411. The AMF 402 may then provide the PVS FQDN to SMF 403. In some embodiments, the AMF 402 may provide the PVS FQDN to SMF 403 during a PDU session establishment. More specifically, the AMF 402 may provide the PVS FQDN to SMF 403 in a SMContextCreate service operation. However, the SMF 40 may receive the PVS FQDN from any network function.

Once the SMF 403 receives the PVS FQDN, the SMF 403 may use the PVS FQDN to select an edge application server discovery function (EASDF) 408. In some embodiments, the SMF 403 may use a DNN and/or S-NSSAI in addition to the PVS FQDN to select the EASDF 408. The SMF 403 provides the UE IP address and selected PVS FQDN to EASDF 408. Although an EASDF is described, it should be appreciated that other network functions may be contemplated.

Additionally, a UE 401 may resolve a received PVS FQDN with a DNS query using DNS 406 such that UE 401 is provided with a PVS IP address. The DNS 406 may be in communication with EASDF 408 (or other network function) which may report the resolved PVS IP address to the SMF 403.

In some embodiments, the SMF 403 and/or PCF 404 may issue a DNS query for the PVS FQDN received by the AMF 402 (or other network function). The SMF 403 and/or PCF 404 may invoke the selected EASDF 408 (or other network function) to issue the DNS query to a DNS 406. The DNS query may include the same IP address range as the UE, such as by using a DNS client subnet edge application server (EAS) option, such as defined in IETF RFC 7871, so the DNS 406 returns the same response as it would do if the query was initiated by a UE.

In some embodiments, the SMF 403 may not directly begin with the PVS FQDN. Instead, the SMF 403 may receive a PVS domain from the AMF 402 (or other network function). In such an instance, the first query performed by the UE 401 is to discover the server supporting the particular provisioning protocol under the PVS domain. Additionally, the SMF 403 may configure the EASDF 408 (or other network function) to report the results of the DNS service discovery queries made by a particular UE 401 to a particular PVS domain and for a particular service (e.g., "brski-registrar._tcp.example.com") to SMF 403. In an instance in which the result is returned to the SMF 403 in FQDN format, SMF 403 may treat the result similarly as to a PVS FQDN which has not yet been resolved by the UE 401. That is, the UE 401 of this example embodiment will resolve the PVS domain, such as in a DNS query discussed below, and the SMF 403 may learn the PVS IP address as described above, such as via the DNS query response. In an instance the result is returned to the SMF 403 in IP address format, the SMF 403 may treat the result as a PVS IP address that has already been resolved by the UE 401 and may skip to operation 3.

At operation 2, the SMF 403 verifies the reported FQDN as reported by EASDF 408 (or other network function) is the same FQDN as the PVS FQDN as received from the AMF 402 (or other network function).

Following successful verification, at operation 3, the SMF 403 may generate and/or update one or more traffic filter rules for a traffic filter set. In some embodiments, the SMF 403 may generate the one or more traffic filter rules based at least in part on the reported DNS query response information received by the EASDF 408. For example, the SMF 403 may authorize the PVS FQDN and the PVS IP address as authorized endpoints and as valid traffic filter rules. The one or more traffic filter rules may include one or more PDRs and/or FARs which define allowed PVS IP traffic. The SMF 403 may then provide the one or more generated traffic rules to UPF 405, such as via an N4 interface. Additionally or alternatively, PCF 404 may generate and/or update one or more traffic filter rules for a traffic filter set and provide the one or more traffic filter rules to the UPF 405.

In some embodiments, based on the particular configuration in the ONN and/or a particular device identity (PEI) received from the AMF 402 (or other network function), the SMF 403 may detect a device type, device model, and/or specific provisioning protocol supported by the UE 401. The SMF 403 may additionally or alternatively receive information about preferred provisioning protocols from DCS 410. In some embodiments, the SMF 403 may generate the one or more traffic rules for UPF 405 such that UPF 405 allows traffic for provisioning protocols for a SO-SNPN 420 and blocks all other traffic on the PDU session used for remote provisioning. In some embodiments, the SMF 40 communicates the preferred provisioning protocols to PCF 404 and PCF 404 generates the one or more traffic rules for UPF 405.

In some embodiments, all data traffic over an onboarding PDU session in the ON-SNPN 400 may be directly tunneled to a SO-SNPN/PVS network. Such tunneling protocols may be based at least in part on an agreement between the ON-SNPN 400 and the SO-SNPN 420. In some embodiments, the ON-SNPN 400 may establish a secure layer 2 or layer 3 tunnel to a gateway in SO-SNPN 420 and/or the network where PVS for the UE 401 is located. When providing the PVS FQDN to the SMF 403, AMF 402 (or other network entity) may additionally or alternatively provide the onboarding SUPI/SUCI realm to SMF 403. The SMF 403 may derive the tunnel endpoint (e.g., gateway address in the SO-SNPN 420 or PVS network) based on the PVS FQDN, domain name in the PVS FQDN, and/or from the realm of SUPI/SUCI. In some embodiments, the DCS 410, SO-SNPN 420, or other network entity may explicitly provide the provisioning gateway address to the ON-SNPN 400. The SMF 403 may derive the SO-SNPN 420 address and/or gateway address from the PVS FQDN, domain name in the PVS FQDN and/or from the realm of the onboarding SUPI/SUCI, or use the gateway address explicitly provided by the DCS 410. The SO-SNPN 420, or any other network entity, may then instruct the UPF 405 to establish a tunnel linked to the UE 401 PDU session. The tunnel establishment procedure may follow the mechanism for Layer 2 Tunneling Protocol (L2TP) support, such as described in 3GPP TS 23.502 section 4.3.2.4. In some embodiments, the tunnel endpoint address can be fetched from the SO-SNPN 420 via a query from the SMF 403. In some embodiments, this query may occur during a secondary authentication of the PDU session or via a NEF in the SO-SNPN 420. In some embodiments, the credentials for establishing a secure tunnel may be preconfigured in SMF 403 or fetched from DCS 410, SO-SNPN 420, or any other network function, such as via NEF. In some embodiments, the credentials for establishing a secure tunnel may be provided by other means from DCS 410, SO-SNPN 420, or any other network function.

FIG. 5 illustrates communications exchanged between various computing entities within an ON-SNPN network 500. As illustrated in FIG. 5, a traffic filter set may be generated using a proxy function in a user plane path. In some embodiments, the proxy function is an application service proxy function (ASPF), such as ASPF 412.

At operation 1 of FIG. 5, an AMF 402 may provide an SMF 403 with a PVS FQDN used for onboarding a UE 401. The AMF 402 may receive a PVS FQDN from any network function. In some embodiments, the AMF 402 may receive the PVS FQDN from a DCS 410 via a AUSF 411. The AMF 402 may then provide the PVS FQDN to SMF 403. In some embodiments, the AMF 402 may provide the PVS FQDN to SMF 403 during a PDU session establishment. More specifically, the AMF 402 may provide the PVS FQDN to SMF 403 in a SMContextCreate service operation. However, the SMF 403 may receive the PVS FQDN from any network function.

Once the SMF 403 receives the PVS FQDN from the AMF 402 (or other network function), it may request an ASPF, such as ASPF and/or HTTP proxy NF 412, to be allocated to serve the onboarding UE. The ASPF may act as a protocol proxy to detect, filter, and/or redirect traffic to and/or from the associated PVS. In some embodiments, the SMF 403 may provide the address of the ASPF 412 to the UE 401 such that the UE may use the ASPF 412 as an outbound proxy server for provisioning purposes. SMF 403 may accomplish this by using a protocol configuration options (PCO), which includes provision of the ASPF IP address and port number. The SMF 403 may additionally configure the UPF 405 to allow the UE to communicate only with the ASPF IP address and port number with a local DNS server. Otherwise, the UPF 405 may drop any received data packets sent from or to the UE 401.

In some embodiments, the SMF 403 may configure the ASPF 412 to only allow the UE 401 to use a http connect method to establish a TLS connection to the PVS FQDN. This may be accomplished using a configuration message provided by SMF 403 to the ASPF 412 containing at least the UE's IP address and PVS FQDN. In some embodiments, the configuration message may contain other parameters such as a timer indicative of how long a timer is allowed, a maximum number of bits allowed over a connection, and maximum bitrate allowed over a connection, and/or the like. The UE 401 may use the ASPF address and port number provided by the SMF 403 to establish a TLS connection to the PVS FQDN. The DNS query is then performed by the ASPF 412 and not the UE 401.

In some embodiments, the ASPF 412 may additionally or alternatively acts as a circuit proxy. That is, ASPF 412 may statically translate the source IP address and/or destination IP address in an incoming data packet to a different source IP address and/or different IP destination address. As such, the UE 401 may be provided with just the IP address and port of the ASPF 412. The SMF 403 and/or PCF 404 may configure the UPF 405 to allow the UE to send data packets only to ASPF 412, which will then forward the data packets received from the UE to the PVS using the static address translation.

Referring now to FIG. 6, an example flowchart 600 implemented, for example, by an apparatus 300 embodied by a network entity, such as SMF 403 and/or PCF 404 configured to generate one or more traffic filter rules for a traffic filter set will be discussed herein.

As shown in block 601, the apparatus 300 embodied by a network entity, such as SMF 403 and/or PCF 404, may include means, such as the processing circuitry 302, the memory 306 or the like, for receiving a PVS domain and/or PVS FQDN from a network function. In some embodiments, the SMF 403 may receive the PVS domain and/or PVS FQDN from AMF 402. In some embodiments, the AMF 402 may have received the PVS FQDN from a DCS via an AUSF 411. In some embodiments, SMF 403 may receive the PVS FQDN during a PDU session establishment and more particularly, during a SMContextCreate service operation. In some embodiments, the SMF 403 and/or PCF 404 may issue a DNS query for the PVS FQDN received from the AMF 402 (or other network function).

In an instance the SMF 403 and/or PCF 404 begins only with a PVS domain, a first DNA query performed by a UE may be used to discover the PVS supporting the particular provisioning protocol under the PVS domain. As such, the SMF 403 and/or PCF 404 may configure the selected network function to report the results of any DNS service discovery queries made by a specific UE to a specific domain and for a specific service.

In block 602, the apparatus 300 embodied by a network entity, such as SMF 403 and/or PCF 404, may include means, such as the processing circuitry 302, the memory 306 or the like, for selecting a network function. The selected network function may be configured to report the resolved IP address originating from a UE, such as UE 401, DNS query as resolved by a DNS 406. In some embodiments, the selected network function may be an EASDF, such as EASDF 408.

In block 603, the apparatus 300 embodied by a network entity, such as SMF 403 and/or PCF 404, may include means, such as the processing circuitry 302, the communication interface 304 the memory 306 or the like, for causing the selected network function to be provided with an address for the UE and the PVS FQDN.

In block 604, the apparatus 300 embodied by a network entity, such as SMF 403 and/or PCF 404, may include means, such as the processing circuitry 302, the communication interface 304 the memory 306 or the like, for receiving a notification from the selected network function. In some embodiments, the notification from the selected network function may be received in an instance a UE originated DNS request is resolved, such as by DNS 406. In some embodiments, the received notification includes a resolved IP address as resolved by DNS 406 based on the UE query.

In block 605, the apparatus 300 embodied by a network entity, such as SMF 403 and/or PCF 404, may include means, such as the processing circuitry 302, the communication interface 304 the memory 306 or the like, for verifying the FQDN as received in the notification matches the PVS FQDN as received from the network function as discussed in block 601. In some embodiments, the FQDN as received in the notification is determined to match the PVS FQDN as received from the network function in an instance the two values are an exact match.

In block 606, the apparatus 300 embodied by a network entity, such as SMF 403 and/or PCF 404, may include means, such as the processing circuitry 302, the communication interface 304 the memory 306 or the like, for generating one or more traffic filter rules for a traffic filter set. In some embodiments, the SMF 403 and/or PCF 404 may generate one or more traffic filter rules based on the FQDN as received in the notification at block 605 and/or the PVS FQDN as received from the network function. In some embodiments, the SMF 403 and/or PCF 404 may generate one or more traffic filter rules such that both the FQDN as received in the notification and the PVS FQDN as received from the network function are authorized endpoints.

In block 607, the apparatus 300 embodied by a network entity, such as SMF 403 and/or PCF 404, may include means, such as the processing circuitry 302, the communication interface 304 the memory 306 or the like, for causing a UPF, such as UPF 405, to be provided with the one or more traffic filter rules. As such, the UPF 405 may enforce the traffic to or from the UE 401 such that only authorized traffic is provided to PVS 135 while taking into consideration the FQDN as resolved by UE 401.

FIG. 7, an example flowchart 700 implemented, for example, by an apparatus 300 embodied by a network entity, such as SMF 403 generate a tunnel from an onboarding UE to a SO-SNPN will be discussed herein.

In block 701, the apparatus 300 embodied by a network entity, such as SMF 403, may include means, such as the processing circuitry 302, or the like, for determining a tunnel point. In some embodiments, SMF 403 may determine a tunneling point based on an agreement between a SO-SNPN and a ON-SNPN such that the SMF 403 may establish a secure Layer 2 or Layer 3 tunnel to a gateway in the SO-SNPN or a network where the PVS for the UE is located. As such, all traffic over the onboarding PDU session in the ON-SNPN may be directly tunneled to the SO-SNPN network and/or network corresponding to the PVS.

In some embodiments, the SMF 403 may receive a PVS FQDN and/or onboarding SUPI/SUCI realm from a network entity, such as AMF 402. Based on the PVS FQDN and/or onboarding SUPI/SUCI realm, the SMF 403 may derive a tunnel endpoint (i.e., gateway address in the SO-SNPN or PVS network). Alternatively, the SMF 403 may receive the gateway address from a network entity, such as DCS 410, SO-SNPN, or other network entity.

In some embodiments, the SMF 403 derives the gateway address from the PVS FQDN or domain name in the PVS FQDN. In some embodiments, the SMF 403 derives the gateway address from the realm of the onboarding SUPI/SUCI. In some embodiments, the SMF 403 derives the gateway address from the gateway address explicitly provided by a network function.

In some embodiments, the tunnel endpoint address may be fetched from the SO-SNPN via a query by SMF 403 during a secondary authentication of the PDU session. In some embodiments, the tunnel endpoint address may be fetched from the SO-SNPN via a query by SMF 403 via a NEF in the SO-SNPN.

The credentials for establishing a secure tunnel may be preconfigured in the SMF 403. Alternatively, the credentials for establishing a secure tunnel may be fetched from a network function and/or entity, such as DCS or SO-SNPN. In some embodiments, the credentials may be provided by a network function and/or entity, such as DCS or SO-SNPN.

In block 702, the apparatus 300 embodied by a network entity, such as SMF 403, may include means, such as the processing circuitry 302, communication interface 304 or the like, for instructing a UPF, such as UPF 405, to establish a tunnel linked to one or several UE PDU sessions. As previously mentioned, the tunnel establishment procedure may follow the mechanism for L2TP support as described in 3GPP TS 23.502 section 4.3.2.4.

FIG. 8, an example flowchart 800 implemented, for example, by an apparatus 300 embodied by a network entity, such as SMF 403 and/or PCF 404 for using a proxy path in the UPF will be discussed herein.

In block 801, the apparatus 300 embodied by a network entity, such as SMF 403 and/or PCF 404, may include means, such as the processing circuitry 302, the memory 306 or the like, for receiving a PVS domain and/or PVS FQDN from a network function. In some embodiments, the SMF 403 may receive the PVS domain and/or PVS FQDN from AMF 402.

In block 802, the apparatus 300 embodied by a network entity, such as SMF 403 and/or PCF 404, may include means, such as the processing circuitry 302, communication interface 304 or the like, for instructing a UPF, such as UPF 405, to request an ASPF to be allocated to serve an associated onboarding device. The ASPF may act as a protocol proxy to detect, filter, and redirect traffic to and/or from a PVS. The SMF 403 and/or PCF 404 may provide the address of the ASPF to the UE such that the UE is made aware to use the ASPF as an outbound proxy server for provisioning. This may be accomplished using PCO operations, which include an ASPF IP address and port number.

In some embodiments, the SMF 403 and/or PCF 404 may configure a UPF to allow the UE to communicate with a local DNS server only over the ASPF IP address and port number. Otherwise, the UPF may be configured to drop all other data packets sent to or from the UE.

In some embodiments, the ASPF may additionally or alternatively acts as a circuit proxy. That is, ASPF 412 may statically translate the source IP address and/or destination IP address in an incoming data packet to a different source IP address and/or different IP destination address. As such, the UE may be provided with just the IP address and port of the ASPF. The SMF 403 and/or PCF 404 may configure the UPF to allow the UE to send data packets only to ASPF, which will then forward the data packets received from the UE to the PVS using the static address translation.

In block 803, the apparatus 300 embodied by a network entity, such as SMF 403 and/or PCF 404, may include means, such as the processing circuitry 302, communication interface 304 or the like, for causing a configuration message to be provide to the selected ASPF. The configuration message may configure the ASPF to only allow the UE to establish a connection, such as a TLS connection, with the PVS FQDN. In some embodiments, the connection may be performed using a http connect method. The configuration message may include the UE's IP address and PVS FQDN. In some embodiments, the configuration message may include other parameters such as a timer of how long a communication is allowed, a maximum number of bits allowed over the connection, a maximum bitrate for the connection, etc.

In block 804, the apparatus 300 embodied by a network entity, such as SMF 403 and/or PCF 404, may include means, such as the processing circuitry 302, communication interface 304 or the like, for causing the address of the ASPF to be provided to the UE, such as UE 401. As such, the DNS query for the PVS FQDN is performed by the ASPF and not the UE itself.

FIG. 9, an example flowchart 900 implemented, for example, by an apparatus 300 embodied by a network entity, such as ASPF 412 for resolving DNS requests in the UPF will be discussed herein.

In block 901, the apparatus 300 embodied by a network entity, such as ASPF 412, may include means, such as the processing circuitry 302, the communication interface 304, or the like, for receiving a configuration message from a network function. In some embodiments, the network function may be a SMF 403 and/or PCF 404.

In block 902, the apparatus 300 embodied by a network entity, such as ASPF 412, may include means, such as the processing circuitry 302, communication interface 304 or the like, for receiving an incoming data packet from a UE.

In block 903, the apparatus 300 embodied by a network entity, such as ASPF 412, may include means, such as the processing circuitry 302, or the like, for generating a DNS query for the PVS FQDN. The ASPF 412 may provide the DNS query to a DNS in the ON-SNPN. The ASPF 412 may also provide the DNS information from the DNS query and/or DNS response to a SMF and/or PCF.

In block 904, the apparatus 300 embodied by a network entity, such as ASPF 412, may include means, such as the processing circuitry 302, the communication interface 304 or the like, for establishing a secure transport layer (TSL) connection between the UE 401 and the PVS FQDN.

FIG. 10, an example flowchart 900 implemented, for example, by an apparatus 300 embodied by a UE, such as UE 401 for causing a data packet to be sent will be discussed herein.

In block 1001, the apparatus 300 embodied by a UE, such as UE 401, may include means, such as the processing circuitry 302, the communication interface 304, memory 306 or the like, for receiving an address for an ASPF and a port number. The UE 401 may store the address and port number for the ASPF in an associated memory.

In block 1002, the apparatus 300 embodied by a UE, such as UE 401, may include means, such as the processing circuitry 302, the communication interface 304 or the like, for causing a data packet to be sent to the ASPF, such as ASPF 412, to establish a secure TSL connection to a PVS FQDN. The data packet sent to the ASPF may be forward by the ASPF to a DNS such that the DNS query is resolved by the ASPF and the UE 401 is able to connect to the PVS FQDN.

FIGS. 6-10 illustrate message flows and flow charts depicting methods according to an example embodiment of the present invention. It will be understood that each block of the message flow may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 306 of an apparatus 300 employing an embodiment of the present invention and executed by a processing circuitry 302. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts and message flows support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although a few variations have been described in detail above, other modifications or additions are possible. In particular, further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It should therefore again be emphasized that the various embodiments described herein are presented by way of illustrative example only and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

That which is claimed is:

1. An apparatus comprising:
processing circuitry; and
at least one memory including computer program code,
the at least one memory and the computer program code configured to, with the processing circuitry, cause the apparatus at least to perform:
receive a provisioning server fully qualified domain name from a network function in response to a user device request to onboard with an onboarding standalone non-public network;
issue a domain name server query for the provisioning server fully qualified domain name received from the network function;
request an application service proxy function to be allocated to serve an associated onboarding user device; and
cause the address of the application service proxy function to be provided to the user device.

2. The apparatus of claim 1 wherein
the at least one memory and the computer program code are further configured to, with the processing circuitry, cause the apparatus at least to perform:
generate one or more traffic filter rules for a traffic filter set or traffic detection rules, wherein the one or more traffic filter rules are generated based at least in part on a domain name service query response related to one or more user device originated domain name service queries; and
cause a user plane function to be provided with the one or more traffic filter rules.

3. The apparatus of claim 2, wherein the at least one memory and the computer program code are further configured to, with the processing circuitry, cause the apparatus at least to perform:
determine one or more provisioning parameters for a particular user device,
wherein, the one or more traffic filter rules for a traffic filter set or traffic detection rules are generated based at least in part on the determined one or more provisioning parameters.

4. The apparatus of claim 3, wherein the one or more provisioning parameters include at least one of a device type, device model, specific provisioning protocol supported by the user device, or preferred provisioning protocol.

5. The apparatus of claim 1, wherein the at least one memory and the computer program code are further configured to, with the processing circuitry, cause the apparatus at least to perform:
select a network function based at least in part on the received provisioning server fully qualified domain name; and
cause the selected network function to be provided with an address for the user device and provisioning server fully qualified domain name.

6. The apparatus of claim 5, wherein the at least one memory and the computer program code are further configured to, with the processing circuitry, cause the apparatus at least to perform:
receive a notification from the selected network function, wherein the notification includes an internet protocol address as resolved by a domain name service query performed by the user device; and
verify the fully qualified domain name included in the notification matches the provisioning server fully qualified domain name as received from the network function.

7. The apparatus of claim 6, wherein generating the one or more traffic filter rules includes verifying that the resolved internet protocol address belongs to a list or a range of allowed internet protocol addresses for a provisioning server domain or the provisioning server fully qualified domain name.

8. The apparatus of claim 5, wherein the at least one memory and the computer program code are further configured to, with the processing circuitry, cause the apparatus at least to perform:
invoke a network function to issue a domain name server query for the provisioning server fully qualified domain name.

9. The apparatus of claim 8, wherein the invoked network function comprises an edge application server discovery function.

10. The apparatus of claim 1, wherein the at least one memory and the computer program code are further configured to, with the processing circuitry, cause the apparatus at least to perform:
configure a user plane function to allow the user device to communicate with the application service proxy function internet protocol address and port number, and with a local domain name server.

11. The apparatus of claim 1, wherein the address of the application service proxy function is caused to be provided to the user device using a protocol configuration option, wherein the protocol configuration option includes an application server proxy function internet protocol address and port number.

12. The apparatus of claim 11, wherein the user plane function is further configured to drop any data packets received from the user device or addressed to the user device which are not directed to the configured application service proxy function internet protocol address and port number.

13. The apparatus of claim 1, wherein the at least one memory and the computer program code are further configured to, with the processing circuitry, cause the apparatus at least to perform:
cause a configuration message to be provided to the selected application service proxy function, wherein the configuration message is indicative of which fully qualified domain names the user device is allowed to use to connect to.

14. The apparatus of claim 1, wherein the at least one memory and the computer program code are further configured to, with the processing circuitry, cause the apparatus at least to perform: derive the tunnel endpoint and associated security credentials.

15. The apparatus of claim 1, wherein the at least one memory and the computer program code are further configured to, with the processing circuitry, cause the apparatus at least to perform: receive the tunnel endpoint address and associated security credentials from a network entity.

16. The apparatus of claim 1, wherein the subscription owning standalone non-public network address is determined based at least in part on the provisioning server fully qualified domain name or the domain name included in the provisioning server fully qualified domain name.

17. An apparatus comprising:
processing circuitry; and
at least one memory including computer program code,
the at least one memory and the computer program code configured to, with the processing circuitry, cause the apparatus at least to perform:
receive a provisioning server fully qualified domain name from a network function in response to a user device request to onboard with an onboarding standalone non-public network;
request an application service proxy function to be allocated to serve an associated onboarding user device;
cause the address of the application service proxy function to be provided to the user device;
select a network function based at least in part on the received provisioning server fully qualified domain name; and
cause the selected network function to be provided with an address for the user device and provisioning server fully qualified domain name.

18. The apparatus of claim 17, wherein the at least one memory and the computer program code are further configured to, with the processing circuitry, cause the apparatus at least to perform:
receive a notification from the selected network function, wherein the notification includes an internet protocol address as resolved by a domain name service query performed by the user device; and
verify the fully qualified domain name included in the notification matches the provisioning server fully qualified domain name as received from the network function.

19. The apparatus of claim 18, wherein generating the one or more traffic filter rules includes verifying that the resolved internet protocol address belongs to a list or a range of allowed internet protocol addresses for a provisioning server domain or the provisioning server fully qualified domain name.

20. The apparatus of claim 17, wherein the at least one memory and the computer program code are further configured to, with the processing circuitry, cause the apparatus at least to perform:
invoke a network function to issue a domain name server query for the provisioning server fully qualified domain name.

21. The apparatus of claim 20, wherein the invoked network function comprises an edge application server discovery function.

22. An apparatus comprising:
processing circuitry; and
at least one memory including computer program code,
the at least one memory and the computer program code configured to, with the processing circuitry, cause the apparatus at least to perform:
receive a provisioning server fully qualified domain name from a network function in response to a user device request to onboard with an onboarding standalone non-public network;
request an application service proxy function to be allocated to serve an associated onboarding user device;
cause the address and the port number of the application service proxy function to be provided to the user device using a protocol configuration option, wherein the protocol configuration option includes an application server proxy function internet protocol address and port number; and
configure a user plane function to allow the user device to communicate with the application service proxy function internet protocol address and port number, and with a local domain name server, wherein the user plane function is further configured to drop any data packets received from the user device or addressed to the user device which are not directed to the configured application service proxy function internet protocol address and port number.

* * * * *